United States Patent [19]

Gee

[11] 4,362,226

[45] Dec. 7, 1982

[54] VISCOUS FLUID CLUTCH AND RESERVOIR BY-PASS VALVE THEREFOR

[75] Inventor: Thomas A. Gee, Allen Park, Mich.

[73] Assignee: Eaton Corporation, Cleveland, Ohio

[21] Appl. No.: 203,025

[22] Filed: Nov. 3, 1980

Related U.S. Application Data

[63] Continuation-in-part of Ser. No. 948,448, Oct. 4, 1978, Pat. No. 4,246,995.

[51] Int. Cl.³ ............................................. F16D 33/10
[52] U.S. Cl. .................................. 192/58 B; 192/82 T
[58] Field of Search ................. 192/58 B, 82 T, 58 A, 192/58 R; 251/141

[56] References Cited

U.S. PATENT DOCUMENTS

| | | | |
|---|---|---|---|
| 3,055,473 | 9/1962 | Oldberg et al. | 192/58 B |
| 3,250,355 | 5/1966 | Weir | 192/58 B |
| 3,419,122 | 12/1968 | Connelly | 192/58 B |
| 3,458,020 | 7/1969 | Lutz | 192/82 R X |
| 3,492,975 | 2/1970 | Caroli et al. | 192/58 B |
| 3,559,785 | 2/1971 | Weir | 192/58 B |
| 3,739,891 | 6/1973 | La Flame | 192/58 C |
| 3,809,197 | 5/1974 | Clancey | 192/58 B |
| 3,964,582 | 6/1976 | Mitchell | 192/58 B |
| 4,056,178 | 11/1977 | Detty | 192/82 T X |
| 4,060,158 | 11/1977 | Kikuchi | 192/82 T |
| 4,062,432 | 12/1977 | Evans | 192/58 B |
| 4,064,980 | 12/1977 | Tinholt | 192/58 B |
| 4,228,880 | 10/1980 | Gee | 192/58 B |
| 4,246,995 | 1/1981 | Gee | 192/58 B |
| 4,305,491 | 12/1981 | Rohrer | 192/82 T X |

Primary Examiner—Rodney H. Bonck
Attorney, Agent, or Firm—C. H. Grace; F. M. Sajovec

[57] ABSTRACT

A viscous fan clutch is typically employed in a fan drive mechanism within a truck or automobile. A shaft, driven by the engine, rotates a clutch member within the fan drive. The clutch member is arranged for fluid engagement with a body member for the transmission of torque thereto when fluid is disposed in an operating chamber defined by complimentary shear surfaces in the clutch and body members. During relative rotation between the two members, fluid is pumped through a return passage to a valve coaxially disposed with the driven shaft which selectively directs a flow of viscous fluid alternately to a storage chamber or directly back into the operating chamber. The valve is biased into a first position in which the fluid is directed into a fluid storage chamber and is actuated into the second position by means of a coaxially disposed solenoid acting upon ferrous metal members of the valve. When the valve is in the second position, a port is opened for fluid communication between the fluid storage chamber and the operating chamber. A system of stops and reinforcing ridges are provided to insure that the valve blade remains in alignment when in the first and second positions.

14 Claims, 9 Drawing Figures

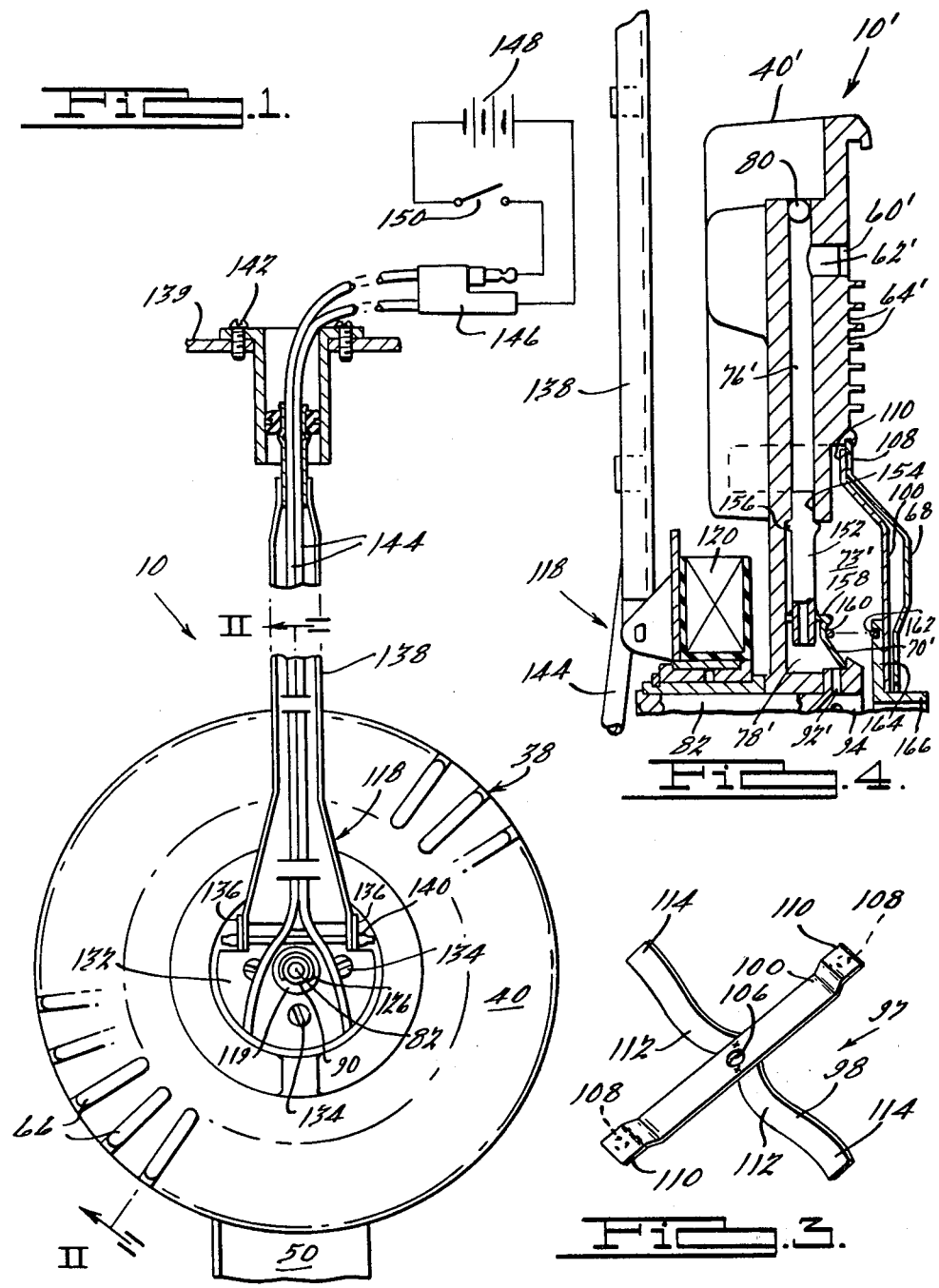

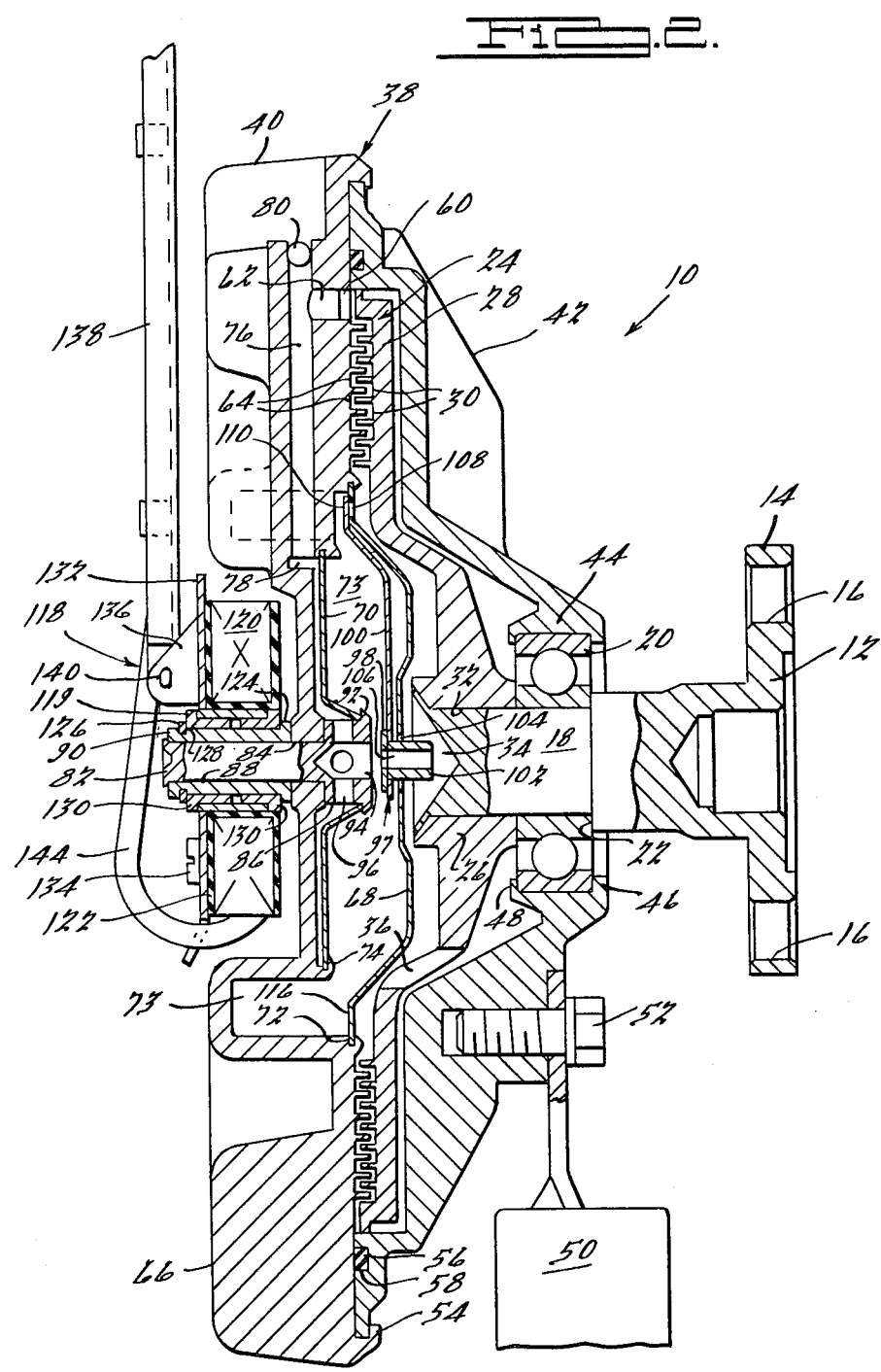

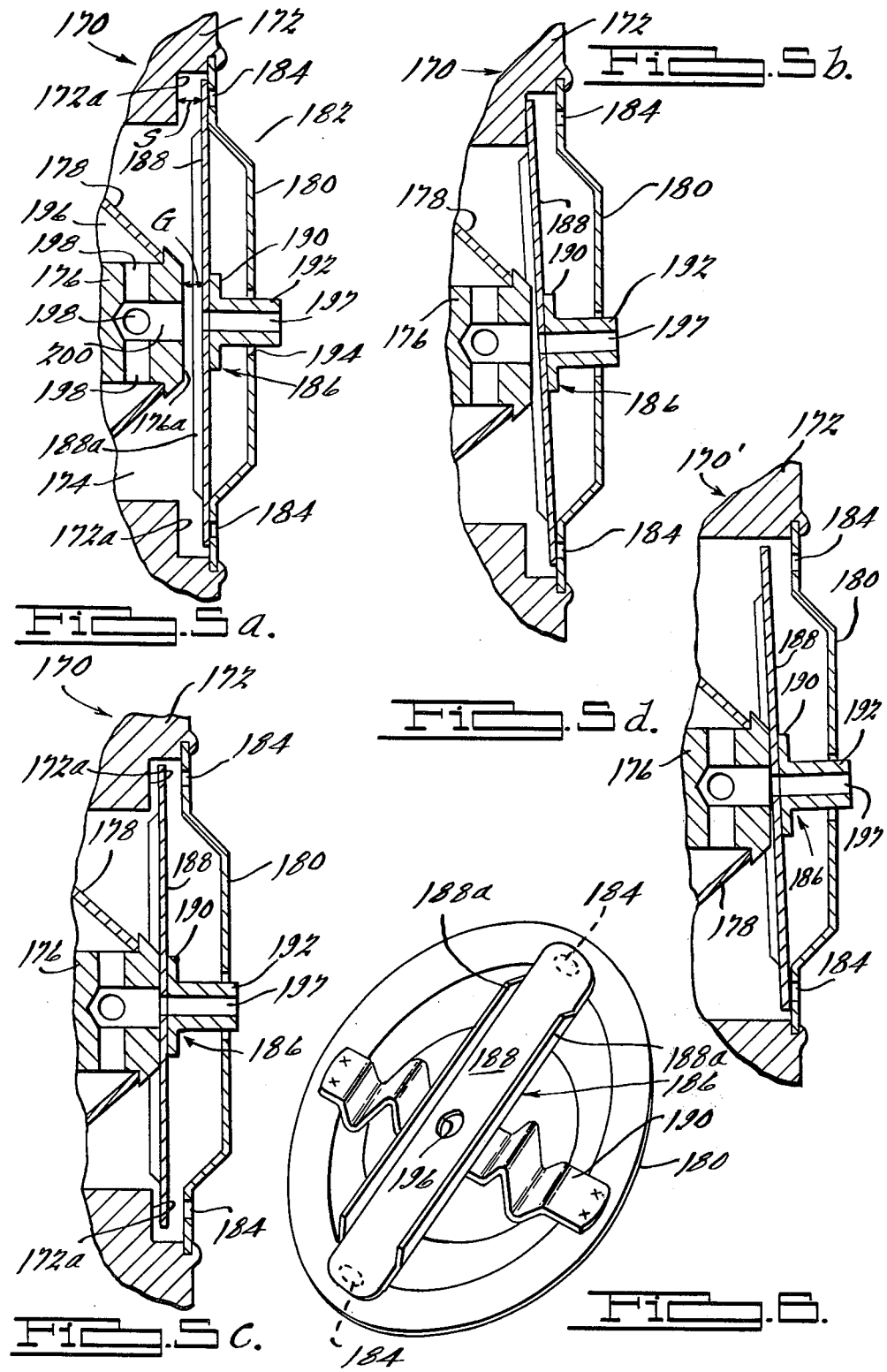

VISCOUS FLUID CLUTCH AND RESERVOIR BY-PASS VALVE THEREFOR

PRIORITY INFORMATION

The present application is a continuation-in-part of U.S. Ser. No. 948,448, filed Oct. 4, 1978, which issued as U.S. Pat. No. 4,246,995 Jan. 27, 1982.

INTRODUCTION

The present invention relates to viscous fluid couplings, and more particularly, to such couplings which incorporate valves to selectively interconnect viscous fluid storage chambers and working chambers.

CROSS REFERENCE

The subject matter of this application is related to that of U.S. application Ser. No. 681,106, filed Apr. 28, 1976, now U.S. Pat. No. 4,056,178 issued Nov. 1, 1977.

BACKGROUND OF THE INVENTION

It will be apparent from a reading of the specification that the present invention may be advantageously utilized with fluid couplings intended for many different applications. However, the invention is especially useful when applied to a viscous fluid coupling which serves as a drive for the radiator cooling fan of a vehicle engine, and will be described in connection therewith.

Viscous fluid couplings have received wide acceptance in the automobile industry for controlling the amount of torque transmitted to a radiator cooling fan. The most common form of such viscous fluid couplings is the air temperature response type such as illustrated in U.S. Pat. No. 3,055,473. In certain applications, however, it has become desirable to directly sense the water temperature in the radiator rather than temperature of the air passing through the radiator. To date, many arrangements have been proposed to accomplish this result. These arrangements, however, have made use of wet and dry plate clutches that are electrically actuated. In each of these arrangements, the advantages achieved through the use of viscous fluid have not been applied.

Another disadvantage common to a viscous fluid couplings employing centrifugal pumps is "morning sickness" i.e., the tendency of the viscous fluid to migrate backward through the pump into the operating chamber when the engine is shut down, causing annoying high speed operation of the fan when the engine is next started in the cold condition such as in the morning. The problem of high speed operation of a viscous fluid coupling upon cold start has been partially alleviated by the use of high capacity pumps which quickly pump any fluid which has drained back into the operating chamber when the engine was off, into a fluid storage chamber. Although this reduced the duration of the "morning sickness," it has not eliminated it. Additionally, a secondary problem caused with the use of high capacity pumps is that for some modes of fan operation, fluid tends to be pumped into the storage chamber more quickly than it can be communicated back into the operating chamber during normal operation of the clutch. This causes an unpredictable response time and in some cases where the input speed is very high relative to fan speed, the fan drive may not engage at all.

BRIEF DESCRIPTION OF THE INVENTION

The present invention finds particular application in a viscous fluid clutch of the type including a first clutch member fixed to a shaft for rotation therewith, a second clutch member mounted for rotation on the shaft and having shear surfaces which coact with complimentary shear surfaces on the first member to define an operating chamber therebetween, a fluid storage chamber disposed near the operating chamber and a pump which circulates fluid between the chambers. According to the invention, a valving element is provided which modulates the fluid circulation and includes an elongated valve blade located within the fluid storage chamber which is axially displaceable between first and second positions to selectively cover and uncover at least one drain port interconnecting the radially outwardmost portion of the fluid storage chamber with the operating chamber. Additionally, valve blade control means are provided to maintain the valve blade in an orientation substantially parallel to that it assumes in the first position when the valve blade is in the second position. The arrangement ensures the complete opening of all of the drain ports when the valve blade is shifted into the second position and thus, precise operation of the clutch.

In the preferred embodiment of the invention, valve blade control is accomplished in part by use of stiffening reinforcement ridges oriented along the line of elongation of the valve blade. This arrangement provides the advantage of an extremely light gauge valve blade which is structurally sound and resistant to deflection during operation of the clutch. Valve blade control is also accomplished by a plurality of circumferentially spaced stops within the fluid storage chamber acting in combination with an axially aligned pole piece to define a first axial limit of travel during transition of said valve blade from the first to second positions and a second axial limit of travel which is less dimensionally extensive than that of the first when the valve blade assumes the second position. This arrangement provides the advantage of preventing contact of the radially innermost portion of the valve blade with the pole piece during transition between positions and preventing contact of the radially outermost ends of the valve blade with the stops when in the second position to prevent misalignment and/or improper seating of the valve blade.

According to the preferred embodiment of the invention, and by way of overcoming the above described shortcomings of viscous fluid clutches and, specifically, eliminating "morning sickness," the viscous fan clutch is provided with a pump which is operative to displace fluid from the operating chamber through a return passage to a valve which selectively discharges the viscous fluid into the fluid storage chamber or directly back into the operating chamber. This arrangement effectively eliminates bleed back into the operating chamber during shut down periods as well as unpredictable or erratic response during operation.

According to another aspect of the invention, the viscous fluid clutch comprises a valving element which is displaceable between first position in which the return passage is in direct fluid communication with the fluid storage chamber and a second position in which the return passage is in direct fluid communication with the operating chamber.

According to another aspect of the invention, the above described valving element is biased into the first position by resilient means such as a spring.

According to another aspect of the invention, the viscous fluid clutch further comprises actuation means which selectively displaces the valving element from the first position to the second position.

According to another aspect of the invention, the above described actuation means comprises a solenoid disposed coaxially with the shaft.

According to another aspect of the invention, the valve further comprises a pole piece coaxially mounted for rotation with the second member which defines a bearing surface supportive of the solenoid.

According to another aspect of the invention, the pole piece defines an axially aligned cavity which exits the end thereof nearest the valving element and further comprises at least one substantially radially disposed port interconnecting the cavity with the return passage.

According to another aspect of the invention, the valving element comprises a by-pass tube which defines a by-pass port in register with the above described cavity, the tube abutting the pole piece when in the second position and being axially displaced therefrom in the first position.

According to another aspect of the invention, the valving element comprises a valve blade disposed within the fluid storage chamber and operative to overlay drain ports which interconnect the radially outwardmost portion of fluid storage chamber with the operating chamber in the first position. When actuated into the second position, the valve blade uncovers the drain ports allowing fluid communication between the two chambers.

According to another aspect of the invention, the above described resilient means is alternatively a coil spring or an elongated leaf spring which is disposed within the fluid storage chamber and secured to the second member. Additionally, the leaf spring is supportive to the valve blade which is affixed substantially normally thereto.

According to still another aspect of the invention, in an alternative embodiment, the return passage comprises a standpipe.

Various other features and advantages of this invention will become apparent upon reading of the following specification, which, along with the patent drawings, describes and discloses a preferred illustrative embodiment of the invention in detail.

The detailed description of the specific embodiment makes reference to the accompanying drawings.

BRIEF DESCRIPTION OF THE DRAWINGS

FIG. 1, is a front plan view, partially in section, of the preferred embodiment of the invention;

FIG. 2, is a sectional view of the clutch of FIG. 1 on an expanded scale;

FIG. 3, is a perspective view of the valving element employed in the preferred embodiment of the invention;

FIG. 4, is a partial sectional view of an alternative embodiment of the invention;

FIGS. 5a-5c, are segmented sectional views of the valving portion of a simplified clutch, illustrating the transition of the valve blade from a first position to a second position through an intermediate position;

FIG. 5d, is a segmented sectional view of the valving portion of the simplified clutch of FIGS. 5a-5c, but with the stops removed; and FIG. 6, is perspective view of the assembled valving element and reservoir cover plate of FIGS. 5a-5d.

DETAILED DESCRIPTION OF THE SPECIFIC EMBODIMENT

Referring to FIGS. 1 and 2, the preferred embodiment of a viscous fluid clutch 10 is illustrated. Clutch 10 comprises a driving shaft 12 including an integral shaft flange 14. Flange 14 defines a number of circumferentially spaced apertures 16 which accommodate bolts (not shown) for mounting clutch 10 to a driven shaft (not shown) such as that of an automobile engine coolant pump which is driven by a pulley and V-belt as is well known in the art. Driving shaft 12 is provided with a reduced intermediate portion 18 which functions as an inner race supporting means for ball bearing assembly 10, a shoulder 22 formed on shaft 12 restrains bearing 20 in one axial direction.

A clutch member 24 is provided with a hub portion 26 and a plate portion 28 having a plurality of concentric annular coupling lands 30 formed on the back side thereof. Hub portion 26 is provided with a straight wall opening 32 which has an interference fit with shaft portion 18 so that clutch member 24 rotates with and is axially retained on shaft 12. Hub portion 26 is pressed onto shaft position 18 until it abuts the inner race of bearing 20 to confine bearing 20 in the other direction of axial movement. The end of shaft 12 distal flange 14 has a conical depression 34 therein. Clutch member 24 is further retained to shaft 12 by swedging of shaft portion 18 proximate conical depression 34. Several breathing apertures 36 are formed in clutch member 24 at the point of transition between hub portion 26 and plate portion 28.

A cover assembly 38 comprising a cover member 40 and a body member 42 is mounted for rotation on shaft 12. Body 42 includes a hub 44 which is supported on the lateral surface of the outer race of bearing assembly 20 and is disposed in an interference fit therewith. A shoulder portion 46 of hub 44 react against an end surface of the outer race of bearing assembly 20 and limits movement of body 42 in one axial direction. A second shoulder portion 48 also formed in hub 44 limits movement of body 42 in the other axial direction. Body 42 and cover 40 are thereby free to rotate about shaft 12 upon bearing assembly 20. A plurality of fan blades 50 are secured at the shank portion thereof by bolts 52 at a radially intermediate portion of body 42. Cover 40 is affixed with body 42 by means of a shoulder portion 54 which circumferentially embraces the radially outwardmost edge of body 42. An elastomeric seal 56 resides in an annular channel 58 in the radially outwardmost portion of body 42 which abuts cover 40.

Cover 40 is provided with an annular recess 60 formed in the face thereof on the side adjacent lands 30. A pair of diametrically opposed axially directed holes 62 are disposed slightly radially outwardly of a second set of annular lands 64, which are defined by cover 40. Annular lands 64 and 30 and the adjoining raised portions of body 42 and cover 40 constitute shear surfaces and define an operating chamber which operates such as described in U.S. Pat. No. 4,056,178, the specification of which is incorporated herein by reference. Annular lands 30 terminates or alternately are cut away in the form of a V-notch to form three equally spaced radially directed channels. The structure defines a known fluid path commencing with the area adjacent lands 30 and 64, the radial channels, axially directed holes 62 and annular recess 60.

Cooling fins 66 are integrally formed in cover 40 adjacent fan blades 50. Cooling fins 66 are arranged to provide additional cooling area to dissipate heat which is generated in clutch 10.

A reservoir cover plate 68 and a return passage cover plate 70 cooperate to define a fluid storage chamber 73. Reservoir cover plate 68 is received in an annular notched recess 72 provided in cover 40 to laterally confine cover plate 68. The material of cover 40 proximate the peripheral edge of cover plate 68 is deformed to retain and seal plate 68 in notched recess 72. Likewise, a second notched recess 74 is formed in cover 40 to confine and seal return passage cover plate 70 when the material of cover 40 is deformed thereover.

Two diametrically opposed radially directed return passage apertures 76 are defined by cover 40 and interconnect holes 62 with a substantially annular return passage cavity 78 which is defined by the left-handmost surface of return passage cover plate 70 and the right-handmost surface of the left-handmost vertical wall of cover 40 as seen in FIG. 2. The radially outwardmost end of return passage apertures 76 and sealed with an interference fit ball 80 or other suitable material.

A pole piece 82 constructed of ferrous material is press-fit in an axial hole 84 in the left-handmost wall of cover 40. Pole piece 82 has a portion of increased diameter 86 which defines a step that abutts the right-handmost surface of the wall of cover 40 and prevents axial displacement of pole piece 82 in one direction. Pole piece 82 projects outwardly from cover 40 through hole 84, the outwardly projecting portion passing through an aperture 88 within a bearing seat 90. The right-handmost end of bearing seat 90 abutts the left-handmost surface of the wall of cover 40 proximate hole 84. Pole piece 82 extends slightly leftwardly beyond aperture 88 of bearing seat 90 and is swedged thereover to confine bearing seat 90 as well as pole piece 82 from lateral or rotational displacement with respect to cover 40.

The portion of increased diameter 86 of pole piece 82 passes through an aperture in return passage cover plate 70 defining the aperture, thereby, preventing axial displacement thereof. Pole piece 82 has an axial bore 94 which exits the right-hand end thereof into fluid storage chamber 73. Four radially disposed apertures 96 interconnect bore 94 with return passage chamber 78.

A valving element 97 which is shown in detail in FIGS. 1, 2 and 3 comprises a leaf spring 98, an elongated valve blade 100 and a by-pass tube 102 disposed within fluid storage chamber 73. By-pass tube 102 has an axially aligned aperture 106 there through in register with central bore 94. The right-handmost end of by-pass tube 102 projects through an aperture 104 and into conical depression 34 in driving shaft 12 which directly communicates with the working chamber. Aperture 106 extends through leaf spring 98. Leaf spring 98 biases valving element 97 into the position illustrated whereby under the influence of the pumping action of clutch 10, viscous fluid will pass through hole 62, radially inwardly along return passage aperture 76 and return passage chamber 78, into pole piece 82 through aperture 96 and into fluid storage chamber 73 through central bore 94.

When actuated, valving element 97 is drawn to the left of its position illustrated in FIG. 2, wherein the left-handmost surface of leaf spring 98 abutts and forms a seal with the right-handmost end of pole piece 82, central bore 94 aligning with aperture 106. In this position, by-pass tube 102 still projects into the working chamber whereby fluid being pumped into and through pole piece 82 will pass through aperture 106 into conical depression 34 and into the working chamber. Leaf spring 98 is drawn against pole piece 82 with sufficient force so as to prevent leakage of fluid therebetween. By-pass tube 102 is free to slide through aperture 104 in reservoir cover plate 68.

Two opposed apertures 108 are formed in a peripheral flange 116 of reservoir cover plate 68 and are covered in the position illustrated by offset leg portion 110 of valve blade 100. Leaf spring 98 tends to bias valving element 97 to the right. This biasing must be overcome to move valving element 97 to the left. When this occurs, offset leg portions 110 also move to the left thereby uncovering apertures 108. In this position, any fluid which is centrifugally held in the radially outwardmost region of fluid storage chamber 73 is free to pass through aperture 108 into the working chamber. Valving element 97 is held together by spot welding or the like with leaf spring 98 and valve blade 100 being disposed substantially normally with one another. Valve blade 100 is constructed of material thick enough to prevent lost motion when biased into the position illustrated or, alternatively, is stiffened by the use of ribs running along the line of elongation of valve blade 100. Leaf spring 98 has symmetrical undulating portions 112 which straddle the central portion affixed to valve blade 100. The offset leg portion 110 of valve blade 100 has the outline of aperture 108 shown in phantom to illustrate where they are overlayed by the offset leg portion 110. At each end of leaf spring 98 is a flat portion 114 which abutts flange 116 of the reservoir cover plate 68 and is affixed thereto such as by spot welding.

A tether assembly 118 is rotatably mounted upon a bearing for rotation about pole piece 82. The bearing comprises bearing seat 90 and a bearing sleeve 119 which is rotatably coaxially disposed thereupon. Bearing seat 90 has an area of increased diameter 124 defining a step which prevents bearing sleeve 119 from axial displacement in one direction. A C-ring 126 is disposed within an annular cavity 128 near the left-handmost end of bearing seat 90 providing a second step which prevents axial displacement of bearing sleeve 119 and the other axial direction. Thus, bearing 119 is free to rotate upon bearing seat 90. Bearing sleeve 119 has two spaced radially outwardly projecting legs 130 which embrace a flanged bracket 132. Flanged bracket 132 supports a coil 120 and coil spool 122 by means of screws 134.

Support members 136 project outwardly from tether assembly 118 and pivotally engage tether extension member 138 by a pivot pin 140. The other end of tether extension member 138 is mounted to the fan shroud 139 of an automobile or the like by screws 142. Electrical wires 144 are connected to coil 120 and pass through tether extension member 138 terminating in a conventional connector 146. In application, wires 144 would be connected in series with a source of energy 148 and a known switch 150 which would be located in the vehicle engine outlet coolant and used to control current to the coil when the temperature of the coolant exiting the engine exceeds a pre-determined value. With current applied to coil 120, a magnetic field is created through pole piece 82, and valving element 97. This field is of sufficient magnetic force to draw valving assembly 97 to the left of the position illustrated in FIG. 2. This drawing force is a solenoid type action. Upon movement of valving element 97, viscous fluid exiting central bore 94 of pole piece 82 will be directed into the working chamber rather than the fluid storage chamber 73 as is the case in the rest position. Upon removal of the source of energy 148 by opening of switch 150, valving element 97 will return to its illustrated position. Return passage cover plate 70 and cover assembly 38 are made of non-magnetic material such as aluminum. This will prevent a reduction in the strength of the magnetic field between pole piece 82 and valving element 97 created by coil 120. It is contemplated that coil 120 may be located elsewhere along the axis of rotation of shaft 12 such as illustrated in U.S. Pat. No. 4,056,178. The location of valving assembly 97 is preferably located along the axis of rotation of shaft 12 to prevent the introduction of centrifugal force into its operation. For this reason, valve blade 100 is preferably balanced around the axis of shaft 12.

In operation, the pumping action caused by the sweeping of the radially outwardmost portion of clutch member 24 by annular recess 60 causes a localized region of increased pressure within the operating chamber. This pumping arrangement is well known in the art and is described in detail in U.S. Pat. No. 3,809,197, the specification of which is incorporated herein by reference. The increased pressure causes the viscous fluid in the operating chamber to pass through holes 62 and into return passage aperture 76. The fluid will then pump radially inwardly through return passage apertures 76 and into return passage chamber 78. Once return passage chamber 78 is filled with fluid, it will enter central bore 94 of pole piece 82 through apertures 96. If the engine coolant temperature is below a pre-determined value, switch 150 will be open and valving element 97 will be in the position illustrated. In this case, fluid passes directly into the storage chamber 73 and is accumulated therein. Within a relatively short time virtually all of the fluid will be pumped into the return passage and fluid storage chamber 73 causing clutch member 24 and shaft 12 to rotatively slip with respect to cover assembly 38 and fan blades 50. Thus, when the engine is cold, the blades will turn relatively slowly. With the blades turning relatively slowly, the engine temperature lacking the supplementary cooling action of the fan, will increase toward operating temperature more rapidly than otherwise would be the case.

Overnight bleed back of fluid from fluid storage chamber 73 to the operating chamber through the pumps is eliminated because the total fluid contained in clutch 10 requires less volume than one half that defined by the fluid storage chamber 73. Accordingly, once fluid is in chamber 73 it cannot migrate backward into return passage chamber 78 and return passage aperture 76.

During operating conditions when the temperature of the vehicle coolant reaches a pre-determined level, switch 150 will close thereby energizing coil 120 and moving valving element 97 to the left to its second or open position. In this position, fluid stored in storage chamber 73 will be free to flow through aperture 108 into working chamber thereby causing the clutch to engage and increasing the relative rate at which the fan 50 is turning. As fluid works itself radially outwardly through the operating chamber, it is in turn pumped through holes 62 and radially inwardly through the return passage aperture 76 in return passage chamber as described hereinabove. As the fluid exits central bore 94 of pole piece 82, it passes through aperture 106 of by-pass tube 102 and exits directly into the operating chamber. By by-passing fluid storage chamber 73 and pumping fluid directly back into the operating chamber, the shear surfaces are not fluid starved as was frequently the case in prior art devices. Additionally, the engage time of clutch 10 between the first and second position is enhanced.

Referring to FIG. 4, an alternative embodiment of viscous fluid clutch 10' is illustrated. The operation of the alternative embodiment illustrated in FIG. 4 is exactly as discussed in a description of the preferred embodiment. Return passage aperture 76' terminate radially outwardly of return passage chamber 78', the two being interconnected by a standpipe 152 which is press fit into a port 154 exiting return passage apertures 76'. Standpipe 152 has a localized circumferential area of increased diameter 156 which serves as a stop when standpipe 152 is pressed into port 154. Standpipe passes through fluid storage chamber 73' and enters return passage chamber 78' through an aperture in the wall 158 of return passage cover plate 70'. Return passage cover plate 70' is retained to cover 40' by pole piece 82 as described in a discussion of the preferred embodiment. One end of a coil spring 160 abutts the right-handmost edge of return passage cover plate 70'. The other end of spring 160 nests within an annular groove 162 within the flange 164 of a flanged by-pass tube 166. The by-pass tube 166 is constructed of ferrous metal for the reasons described in the discussion of the preferred embodiment of the invention. Spring 160 tends to bias by-pass tube 166 into the illustrated position and actuation of coil 120 will cause it to move to the left. Means are provided to prevent by-pass tube 166 and valve blade 100 from rotating from the position illustrated. For example, by-pass tube 166 can be rectangular in cross-section and pass through a suitably dimensioned and shaped hole in reservoir cover plate 68 whereby tube 166 is free to slide axially therethrough under the influence of the actuation means but not rotate, thereby maintaining the overlaying relationship between leg portion 110 and aperture 108.

To better illustrate the valving operation of the present invention, and particularly, details of operation during transition of the valving element between its first and second positions, a simplified model of a viscous fluid clutch 170 is illustrated in FIGS. 5a through 5d and 6. It is to be understood that the model is intended for purposes of demonstrating valving operation only and that many details have been deleted for the sake of clarity. It can be assumed, however that unless otherwise specified, the operation of the model clutch 170 in FIGS. 5a through 5d and 6 is identical to that of the clutch 10 described in FIGS. 1 through 3. FIGS. 5a through 5d illustrate a fractional portion of a cover 172 of viscous fluid clutch 170 in the area defining a fluid storage chamber 174. An axially aligned pole piece 176 and return passage cover plate 178 are mounted for rotation with cover 172. A reservoir cover plate 180 substantially closes the right-handmost extent of fluid storage chamber 174 as viewed in FIG. 5a and is secured for rotation with cover 172. The area rightwardly of the right-handmost surface of reservoir cover plate 180 comprises an operating chamber generally designated at 182. Two circumferentially opposed apertures or drain ports 184 formed in reservoir cover plate 180 provide for fluid communication between the radially outwardmost portion of fluid storage chamber 174 and operating chamber 182. A valving element 186 comprising an elongated valve blade 188, an elongated undulating leaf spring 190 and a by-pass tube 192 are secured to reservoir cover plate 180 within fluid storage chamber 174. By-pass tube 192 extends rightwardly as viewed in FIG. 5a through an aperture 194 within reservoir cover plate 180 and terminates within operating chamber 182. Aperature 194 is sized large enough to allow by pass tube 192 to rotate or become slightly skewed during transition between first and second positions without touching cover plate 180. A bore or by-pass passageway 197 passes through by-pass tube 192, leaf spring 190 and valve plate 188 and operates to provide for communication between fluid storage chamber 174 and operating chamber 182.

The details of valving element 186 and its assembly with reservoir cover plate 180 are best illustrated in FIG. 6. All of the constituents parts of valving element 186 as well as reservoir cover plate 180 are formed of ferrous metals such as steel. Valve blade 188, leaf spring 190 and by-pass tube 192 are affixed to one another such as by spot welding or other suitable process. Likewise, the radially outwardmost ends of leaf spring 190 are affixed to reservoir cover plate 180 such as by spot welding. Leaf spring 190 is formed in serpentine or undulating fashion whereby its ends are fixed with respect to reservoir cover plate 180 and cover 172 while its radially innermost portion as well as valve blade 188 and by-pass tube 192 are axially displaceable upon deformation of leaf spring 190. The radially outwardmost ends of valve blade 188 operate to selectively overlay drain ports 184 as best illustrated in FIG. 5a. The lateral edges of valve blade 188 terminate in a pair of opposed reinforcement ridges 188a integrally depending therefrom in a generally leftward direction as illustrated in FIG. 5a.

Cover 172 includes an area of reduced diameter defining a stop 172a which is spaced leftwardly of valve blade 188 by a dimension designated S as viewed in FIG. 5a. Fluid returning from the pump via a radially inwardly directed return passage enters a return passage chamber 196 defined in part by pole piece 176 and return passage cover plate 178. Return passage chamber 196 communicates with fluid storage chamber 174 through a plurality of radially aligned apertures 198 and a central bore 200 within pole piece 176. Bore 200 exits pole piece 176 into fluid storage chamber 174 through its right-handmost surface 176a as viewed in FIG. 5a. Pole piece 176 is axially positioned so that surface 176a is axially spaced from valve blade 188 by a dimension G when it is in its first position as illustrated in FIG. 5a.

FIG. 5a illustrates the condition when valving element 186 is in its first position in which valve blade 188 overlays drain ports 184 to prevent fluid communication between fluid storage chamber 174 and operating chamber 182. FIG. 5b illustrates valving element 186 in an intermediate position when it is shifting from its first position to its second position. FIG. 5c illustrates valving element 186 in its second position wherein drain ports 184 are open and operating chamber 182 is in free communication with fluid storage chamber 174. As is described in detail in the description of operation of the preferred embodiment of the invention relating to FIGS. 1 through 3, energization of the coil causes valve blade 188 to be electromagnetically drawn from its first position to its second position in a sequence illustrated serially in FIGS. 5a, 5b and finally 5c. The applicant has noted that, for proper operation of clutch 170, the portion of valving element 186 in register with surface 176a of pole piece 176 should seat squarely thereon to completely block fluid communication between return passage chamber 196 and fluid storage chamber 174 when in the second position. As should be obvious in light of the present specification, any angular mispositioning of valving element 186 which prevents it from seating squarely on surface 176a will result in at least a portion of the viscous fluid leaking radially outwardly therebetween into fluid storage chamber 174 rather than into operating chamber 182 through by-pass bore 197.

Because dimension G cannot always be uniform, during energization of the coil, the magnetic flux density is likely to be stronger at one point on surface 176 than on others causing valving element 186 to rotate during its transitional phase as illustrate in FIG. 5b.

The present invention provides a system of valve blade control means which operate to insure that valve blade 188 assumes an orientation when in the second position (as illustrated in FIG. 5c) which is substantially parallel to that which it assumes when it is in the first position (as illustrated in FIG. 5a). The control is effected from two sources. First, reinforcement ridges 188a operate to prevent bending or undue distortion of valve blade 188 while being adequately laterally spaced and dimensioned to allow for free transposition between the first and second positions without interfering with pole piece 176. The second form of control is effected by stops 172a, surface 176a and their relative axial positioning with respect to valve blade 188 when it is in its first position as illustrated in FIG. 5. Without stops 172a (as illustrated in FIG. 5d) valving element 186 would be free to rotate from its first position until valve blade 186 contacted a point on surface 176a. As should be obvious to one of ordinary skill in the art, such contact will result in a localized great flux concentration as opposed to the area of surface 176a and valve blade 188 still separated by an airgap (and leaking viscous fluid). Such a situation has been found by the applicant to freeze valving element 186 in its position as illustrated in FIG. 5d and thus prevent full transition to the second position. In such a position, not only will fluid exiting bore 200 leak into fluid storage chamber 174, one end of valve blade 186 will keep one of the drain ports 184 substantially covered thereby inhibiting draining of the fluid within fluid storage chamber 174 into operating chamber 182. By including stops 172a and dimensionally arranging clutch 170 whereby spacing (S) greater than the intended valve opening (G) but less than twice the intended valve opening (2G) assures that transition into the second position will be completed by preventing valve blade 188 from contacting surface 176a of pole piece 176 until the radially outwardmost ends of valve blade 188 have been axially displaced from both drain ports 184 to insure free flow therethrough. Accordingly, the dimensional relationship whereby $2G > S > G$ is deemed critical to the operation of the present invention. Finally, by dimensioning S greater than G, when valving element 186 assumes its second position as illustrated in FIG. 5c, the radially outwardmost ends of valve blade 186 remain spaced from stops 172a to insure square seating of valve blade 188 on surface 176a of pole piece 176.

Restated, stops 172a only come into play during the transitional phase when valving element is being displaced from its first position to its second position and define a first limit of travel affecting the radially outwardmost end of valve blade 188. Surface 176a of pole piece 176 defines a second limit of travel which is less extensive in axial displacement from valve blade 188 when it is in its first position and only comes into operation as valving element 186 assumes its second position as illustrated in FIG. 5c affecting the radial inwardmost portion of valve blade 188.

It is to be understood that the invention has been described with reference to specific embodiments which provide the features and advantages previously described, and that such specific embodiments are susceptible of modification, as will be apparent to those skilled in the art. For example, an obvious modification of the present invention would be to spring bias the valving element into the second position whereby the solenoid would operate to displace the valving element into the first position. Accordingly, the foregoing is not to be construed in a limiting sense.

What is claimed is:

1. A viscous fluid clutch comprising:
   a first member secured for rotation with a shaft;
   a second member rotatbly disposed on said shaft relative to said first member;
   shear surfaces disposed on said first and second members and forming an operating chamber therebetween;
   a fluid storage chamber adjacent said operating chamber;
   pump means operative to circulate fluid between said operating chamber and fluid storage chamber;
   a valving element operable to modulate said fluid circulation and including an elongated valve blade disposed within said fluid storage chamber and axially displaceable between a first position in which said blade overlays at least one drain port interconnecting the radially outwardmost portion of said fluid storage chamber with said operating chamber, and a second position in which said blade uncovers said drain port, thereby permitting fluid communication between said fluid storage chamber and said operating chamber; and
   valve blade control means comprising stiffening means cooperatively oriented along the line of elongation of said valve blade and operative to maintain said valve blade in an orientation substantially parallel to that assumed in said first position when said valve blade is in said second position.

2. The viscous fluid clutch of claim 1, wherein said stiffening means comprises laterally opposed reinforcement ridges integrally depending from said valve blade.

3. A viscous fluid clutch comprising:
   a first member secured for rotation with a shaft;
   a second member rotatbly disposed on said shaft relative to said first member;
   shear surfaces disposed on said first and second members and forming an operating chamber therebetween;
   a fluid storage chamber adjacent said operating chamber;
   pump means operative to circulate fluid between said operating chamber and fluid storage chamber;
   a valving element operable to modulate said fluid circulation and including an elongated valve blade disposed within said fluid storage chamber and axially displaceable between a first position in which said blade overlays at least one drain port interconnecting the radially outwardmost portion of said fluid storage chamber with said operating chamber, and a second position in which said blade uncovers said drain port, thereby permitting fluid communication between said fluid storage chamber and said operating chamber; and
   valve blade control means comprising stop means operative to define an axial limit of travel for the radially outwardmost ends of said valve blade during transition from said first position to said second position, and operative to maintain said valve blade in an orientation substantially parallel to that assumed in said first position when said valve blade is in said second position.

4. The viscous fluid clutch of claim 3, wherein said valve blade control means further comprises a substantially axially aligned pole piece operative to define an axial limit of travel for the radially innermost portion of said valve blade when in said second position.

5. The viscous fluid clutch of claim 4, wherein said valve blade, while in said first position, is axially spaced from said stop means by a dimension S and from said pole piece by a dimension G where dimensions S and G conform to the following relationship: $2G>S>G$, whereby the ends of said valve blade are axially spaced from said stop means when in said second position.

6. The viscous fluid clutch of claim 5, further comprising resilient means operative to bias said valve blade into said first position and electro-magnetic actuation means operative to selectively displace said valve blade from said first position to said second position.

7. A viscous fluid clutch comprising:
   a first member secured for rotation with a shaft;
   a second member rotatably disposed on said shaft relative to said first member;
   shear surfaces disposed on said first and second members and forming an operating chamber therebetween;
   a fluid storage chamber adjacent said operating chamber;
   pump means operative to displace fluid from said operating chamber to a return passage;
   a valving element axially displaceable between a first position in which said return passage is in direct fluid communication with said fluid storage chamber and a second position in which said return passage is in direct fluid communication with said operating chamber, said valving element including an elongated valve blade disposed within said fluid storage chamber which overlays at least one drain port interconnecting the radially outwardmost portion of said fluid storage chamber with said operating chamber when in said first position and which uncovers said drain port, thereby permitting fluid communication between said fluid storage chamber and said operating chamber when in said second position; and
   valve blade control means operative to maintain said valve blade in an orientation substantially parallel that assumed in said first position when said valve blade is in said second position.

8. The viscous fluid clutch of claim 7, wherein said valve blade control means comprises stiffening means cooperatively oriented along the line of elongation of said valve blade.

9. The viscous fluid clutch of claim 8, wherein said stiffening means comprises laterally opposed reinforcement ridges integrally depending from said valve blade.

10. The viscous fluid clutch of claim 7, wherein said valve blade controls means comprises a plurality of circumferentially spaced stops within said fluid storage chamber operative to define an axial limit of travel for the radially outwardmost ends of said valve blade during transition from said first position to said second position.

11. The viscous fluid clutch of claim 10, wherein said valve blade control means further comprises a substantially axially aligned pole piece operative to define an axial limit of travel for the radially innermost portion of said valve blade when in said second position.

12. The viscous fluid clutch of claim 11, wherein said valve blade, while in said first position, is axially spaced from said stops by a dimension S and from said pole piece by a dimension G where dimensions S and G conform to the following relationship: $2G > S > G$, whereby the ends of said valve blade are axially spaced from said stops when in said second position.

13. The viscous fluid clutch of claim 12, further comprising resilient means operative to bias said valve blade into said first position and electro-magnetic actuation means operative to selectively displace said valve blade from said first position to said second position.

14. The viscous fluid clutch of claim 7, wherein said valve blade overlays a plurality of said drain ports which are circumferentially opposed with respect to one another.

* * * * *